US007775404B2

(12) United States Patent
Pardonge et al.

(10) Patent No.: US 7,775,404 B2
(45) Date of Patent: Aug. 17, 2010

(54) PUMP FOR DISPENSING FLUID PRODUCTS

(75) Inventors: Jean-Marc Pardonge, Les Authieux sur Port Saint Quen (FR); Christophe Fagot, Mezy (FR); Samuel Pruvot, Saint Etienne du Vaudray (FR); François Le Maner, La Vallée Montaure (FR)

(73) Assignee: Valois S.A.S, Le Neubourg (FR)

( * ) Notice: Subject to any disclaimer, the term of this patent is extended or adjusted under 35 U.S.C. 154(b) by 689 days.

(21) Appl. No.: 10/578,498

(22) PCT Filed: Nov. 3, 2004

(86) PCT No.: PCT/FR2004/050561

§ 371 (c)(1),
(2), (4) Date: Jun. 20, 2007

(87) PCT Pub. No.: WO2005/044464

PCT Pub. Date: May 19, 2005

(65) Prior Publication Data

US 2007/0295756 A1 Dec. 27, 2007

(30) Foreign Application Priority Data

Nov. 7, 2003 (FR) .................................. 03 13093

(51) Int. Cl.
*G01F 11/00* (2006.01)

(52) U.S. Cl. .................. 222/321.7; 222/321.6; 222/340

(58) Field of Classification Search .............. 222/321.1, 222/321.6, 321.7, 321.8, 321.2, 321.9, 340, 222/341, 372; 239/333
See application file for complete search history.

(56) References Cited

U.S. PATENT DOCUMENTS

| | | | | |
|---|---|---|---|---|
| 4,503,997 | A | 3/1985 | Corsette | |
| 4,640,443 | A | 2/1987 | Corsette | |
| 4,830,284 | A * | 5/1989 | Maerte | 222/321.6 |
| 5,207,659 | A * | 5/1993 | Pennaneac'h et al. | 222/340 |
| 5,377,881 | A | 1/1995 | Jouillat | |
| 5,692,649 | A * | 12/1997 | Schwab | 222/321.9 |
| 5,816,453 | A * | 10/1998 | Spencer et al. | 222/321.7 |
| 6,053,368 | A * | 4/2000 | Geimer | 222/321.7 |
| 6,209,760 | B1 | 4/2001 | Fuchs | |
| 7,014,069 | B2 * | 3/2006 | Crosnier et al. | 222/321.7 |
| 7,182,226 | B2 | 2/2007 | Mbonyumuhire | |
| 2003/0183655 | A1 * | 10/2003 | Padar | 222/321.6 |

FOREIGN PATENT DOCUMENTS

FR 2838787 A1 10/2003

* cited by examiner

*Primary Examiner*—Kevin P Shaver
*Assistant Examiner*—Jonathan Wood
(74) *Attorney, Agent, or Firm*—Sughrue Mion, PLLC

(57) ABSTRACT

A pump for dispensing fluid products includes a pump body, a pump chamber, at least one piston sliding inside the pump chamber for dispensing a fluid product, a dispensing orifice, and a shutter which interacts with the dispensing orifice and is embodied in such a way that it is movable and/or deformable between the closed position of the dispensing orifice and the open position thereof, the shutter being elastically driven to a closed position. The pump includes only one elastic element in the form of a spring for bringing at least one piston to a rest position after actuation and for driving the shutter to a closed position and the at least one piston is embodied in one piece with the shutter.

13 Claims, 1 Drawing Sheet

15
30
20
39
70
71
78
18
10
75
50
65
45
38
40
34
60

PUMP FOR DISPENSING FLUID PRODUCTS

BACKGROUND OF THE INVENTION

1. Field of the Invention

The present invention relates to a pump for dispensing fluid products, and a device for dispensing fluid products comprising such a pump.

2. Description of Related Art

Pumps for dispensing fluid products are well known in the prior art, and are used to dispense fluid products, particularly in the areas of perfumery, cosmetics or pharmacy. These pumps generally comprise a pump body and a pump chamber in which at least one piston slides in order to dispense a dose of product each time it is actuated. The pump chamber generally comprises an inlet valve and an outlet valve. A dispensing head incorporating the dispensing orifice is generally assembled on the pump, said head comprising an expulsion channel connecting said pump to said dispensing orifice. In particular when the fluid product is a pharmaceutical product, it may be necessary to avoid any contamination of this product, in which case a shutter or obturator can be provided in the dispensing orifice. This shutter is generally driven to its closed position by an elastic element, and is opened at the time of expulsion in order to allow the product to come out. When the device is a spray device, an insert may additionally be provided placed in the expulsion channel to reduce the ullage or dead volume thereof and to promote the spraying of the product. Since the pump is part of a device for dispensing fluid product, a retaining or fixing ring is generally provided to anchor or fix this pump to a tank containing the fluid product. A plunger or dip tube may also be combined with the pump in order to extend to the bottom of the tank and allow the totality of the product contained therein to be dispensed. This type of pump, which is well-known, comprises a relatively high number of constituent parts, which makes its manufacture and assembly relatively complicated and expensive. Another problem which may arise, particularly when the fluid product is a pharmaceutical product, is that the product is generally in contact with the pump springs, these generally being made of metal. Depending on the pharmaceutical product under consideration, this type of contact with a metal product may be damaging and cause the product to be corrupted.

BRIEF SUMMARY OF CERTAIN EMBODIMENTS OF THE INVENTION

The purpose of the present invention is to provide a pump for dispensing fluid product which does not reproduce the above-mentioned drawbacks.

More particularly, the purpose of the present invention is to provide a pump for dispensing fluid products which is simple and inexpensive to manufacture and assemble.

A particular purpose of the present invention is to provide a pump for dispensing fluid products which is composed of a minimum number of constituent parts.

Another purpose of the present invention is to provide a pump for dispensing fluid products, which eliminates any risk of the fluid product dispensed by said pump being corrupted, particularly by eliminating all contact with metal parts.

The subject matter of the present invention is therefore a pump for dispensing fluid products comprising a pump body, a pump chamber, at least one piston sliding in said pump chamber to dispense the fluid product, a dispensing orifice, and a shutter interacting with said dispensing orifice, said shutter being movable and/or deformable between a closed position of the dispensing orifice and an open position of the dispensing orifice, said shutter being elastically driven to its closed position, the pump comprising only one elastic element, such as a spring, adapted for bringing said at least one piston back to its rest position after actuation and for driving said shutter to its closed position, and said pump body being embodied in one piece with said shutter.

To advantage, said spring is away from any contact with the fluid product.

To advantage, the pump comprises a retaining ring adapted to anchor said pump to a tank.

According to a first embodiment of the present invention, said pump body is embodied in one piece with said retaining ring.

To advantage, said retaining ring is embodied in one piece with a plunger tube intended to extend into a tank.

To advantage, said retaining ring is embodied in one piece with an inlet valve seat of the pump chamber.

Preferably, the pump comprises a dispensing head including the dispensing orifice.

According to one embodiment variant of the invention, said pump body is placed inside said dispensing head.

To advantage, said dispensing head is connected, particularly by being snapped, irremovably onto said retaining ring, said dispensing head and said retaining ring forming a stop to define the rest position of the pump.

According to one embodiment variant of the present invention, an insert is placed in the pump chamber upstream of the dispensing orifice.

To advantage, said insert is embodied in one piece with said shutter.

To advantage, said pump is constituted by only four parts including the part forming the dispensing head, the part forming the piston and shutter, the part forming the spring, and the part forming the pump body, retaining ring and plunger tube.

To advantage, the part forming the pump body, retaining ring and plunger tube also forms the inlet valve seat of the pump chamber, interacting with a valve element.

According to one embodiment variant, the valve element is integral with the part forming the piston and shutter.

To advantage, said pump chamber is placed immediately upstream of said dispensing orifice, said shutter forming an outlet valve of said pump chamber.

The subject matter of the present invention also comprises a device for dispensing fluid products, including a tank and a pump as described above.

To advantage, the pump is anchored, in particular by being snapped onto the tank with the interposition of a gasket.

BRIEF DESCRIPTION OF THE DRAWINGS

Other characteristics and advantages of the present invention will emerge more clearly from the following detailed description of a number of embodiments and variants of the present invention, drawn up with reference to the appended drawings, given as non-restrictive examples and wherein.

DETAILED DESCRIPTION OF EXEMPLARY EMBODIMENTS OF THE INVENTION

Figures 1, 2, 3, 4:
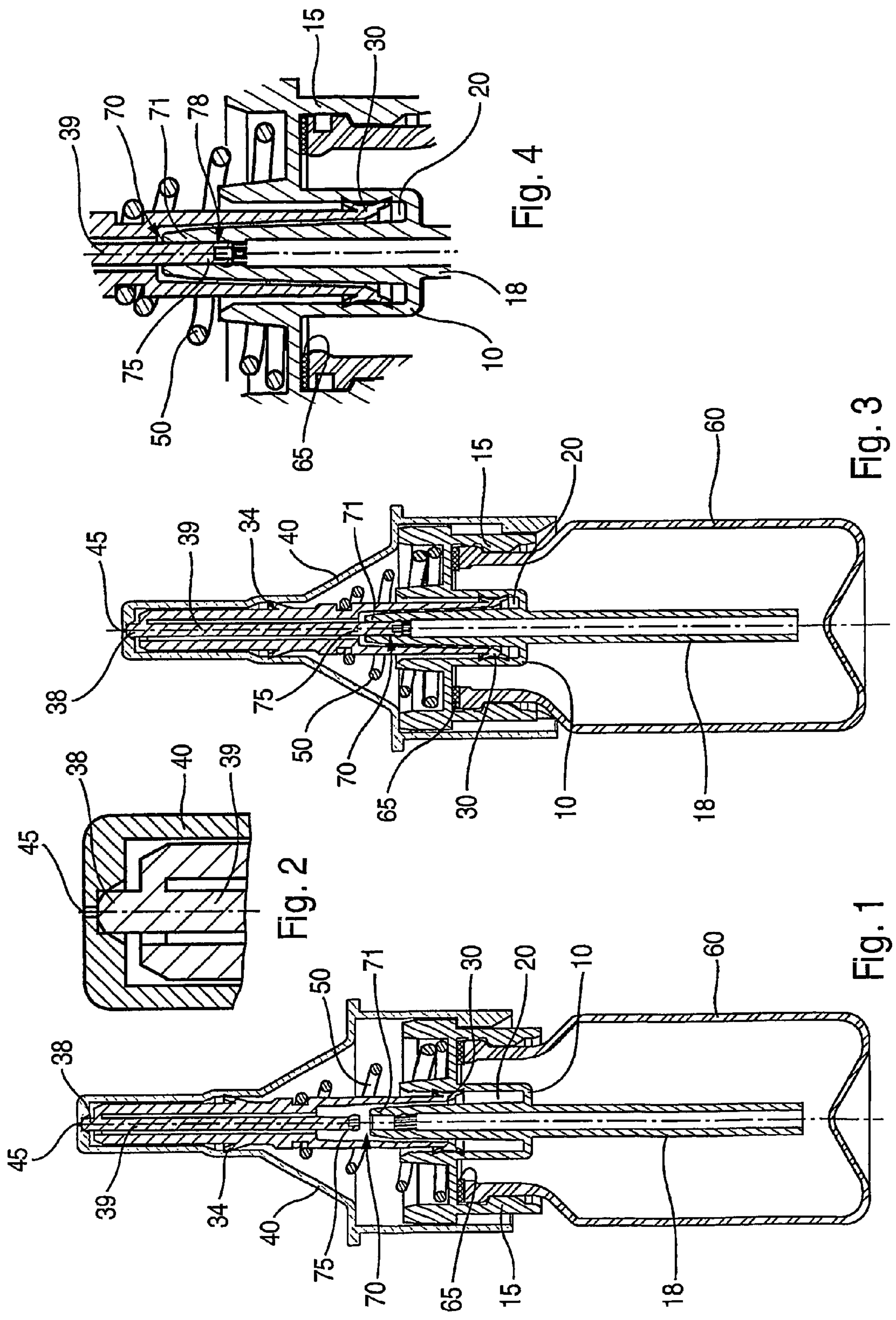
FIG. 1 is a diagrammatic view in transverse cross-section of a device for dispensing fluid products comprising a pump for dispensing fluid products embodied according to an advantageous embodiment of the present invention, in the rest position of the pump.
FIG. 2 is an enlarged diagrammatic view of a part of the device in FIG. 1.
FIG. 3 is a view similar to that in FIG. 1 in the pump dispensing position.
FIG. 4 is an enlarged diagrammatic view of a part of the device in FIGS. 1 and 3.

The dispensing pump according to the present invention comprises a pump body 10 in which at least one piston 30 slides. Said at least one piston 30 slides in a pump chamber 20 to dispense a dose of fluid product through a dispensing orifice 45, each time the pump is actuated. Said pump chamber 20 preferably comprises an inlet valve 70. To avoid any contamination of the product between two actuations, the dispensing orifice 45 is provided with a shutter or obturator 38 which is movable and/or deformable between a closed position of this dispensing orifice 45 and an open position thereof, said shutter 38 being elastically driven to its closed position. According to the invention, the pump comprises only one elastic element 50, such as a spring, which is adapted both for bringing the piston 30 back to its rest position after actuation and for driving the shutter 38 to its closed position. To advantage, this spring is placed away from any contact with the fluid product, which avoids any danger of contamination, particularly when this spring is made of metal. Preferably, the pump comprises a dispensing head 40 which incorporates the dispensing orifice 45. To advantage, the pump chamber 20 is placed at least partially in said dispensing head 40, directly upstream of said dispensing orifice 45. The shutter 38 then forms the outlet valve of this pump chamber. The pump may be anchored or fixed to a tank 60 containing the fluid product by means of a retaining or fixing ring 15 which may be of any desired type, able for example to be screwed on, snapped on or crimped. Preferably, the pump is assembled on the tank 60 by means of said retaining ring 15 with interposition of a gasket 65 between these two elements.

The figures show an advantageous embodiment of the present invention. In this embodiment, the retaining ring 15 is to advantage embodied in one piece with the pump body 10. Preferably, this retaining or dip ring 15 is also embodied in one piece with a plunger tube 18 which extends towards the bottom of the tank 60. As shown in the figures, this plunger tube 18 may also extend inside the pump body through an axial tubular extension forming the valve seat 71 of the inlet valve 70 of the pump chamber 20. The piston 30 is embodied in one piece with the shutter 38. Moreover, an insert 39 may be provided upstream of the dispensing orifice 45 in the pump chamber 20, this insert being preferably embodied in one piece with said shutter 38. This insert 39 may form at its lower end the valve element 75 of the inlet valve 70 of the pump chamber, which interacts with the valve seat 71 described previously. As shown in the figures, the pump includes only one spring 50, which in this embodiment is placed away from the pump body 10, outside said retaining ring 15, so that it is away from all contact with the fluid product. To advantage, the pump comprises a second piston 34, preferably integral with the first piston 30, and which slides in a sealed way in the dispensing head 40 in order to partly reduce said pump chamber 20.

The pump shown in the figures operates as follows. When the user presses on the dispensing head 40 from the position shown in FIG. 1, the dispensing head descends axially relative to the tank by compressing the spring 50. In doing this, the valve element 75 formed on the lower end of the insert 39 interacts with the valve seat 71 of the inlet valve 70 to close this inlet valve. The volume of the pump chamber 20 is then defined and extends between the pump body 10, the first piston 30, and the second piston 34 and the shutter 38 which closes the dispensing orifice 45. Applying further axial actuation force to the dispensing head 40 causes a rise in pressure in the pump chamber 20, which causes an axial displacement of the piston 30, and therefore of the shutter 38 moving away from the dispensing orifice 45, allowing the product to be dispensed through it. When the user relaxes his pressure of the dispensing head 40, it is brought back to its rest position via the spring 50, just as the piston 30 and therefore the shutter 38 is also brought back to its rest position simultaneously. Preferably, the dispensing head 40 is connected, particularly by being irremovably snapped onto the retaining ring 15, forming with the latter a stop position which defines the rest position of the pump. The pump chamber 20 preferably extends directly upstream of the dispensing orifice 45, at least partially into the dispensing head 40. It is therefore vital for dispensing head 40 not to be movable, so as to avoid any risk of the product contained the chamber being corrupted. To advantage, the inlet valve seat 71 of the inlet valve 70 comprises air passage means 78 offset axially relative to said inlet valve seat 71, and able to interact with the valve element 75 during priming. This position is shown in FIG. 4, in which it can be seen that these passage means 78 are formed by one or more lateral grooves provided in the wall of the tubular element forming the valve seat 71, and adapted to interact with the end 75 of the insert 39 provided with corresponding passage grooves or ribs. This priming position may be attained when the pump chamber is filled with air. After the air is evacuated, the pump chamber then fills with product, and the next times the pump is actuated, this valve element 75 will not be able to move as far as these passage means 78 while the product is being dispensed, but only at the end of actuation. The priming means therefore do not generate any risk of dose loss during normal actuation of the pump.

One particular advantage of the present invention is that it makes it possible to embody a pump with a minimum number of constituent parts. The pump shown in the figures is thus able to be embodied with only four components, namely the part forming the dispensing head 40, the part forming the pump body 10, retaining ring 15 and plunger tube 18, the part forming the spring 50, and the part forming the piston 30 and the shutter 38. The pump is then assembled onto the tank 60 with interposition of a gasket 65, and it can thus clearly be seen that the number of parts in the pump according to the invention is lower compared with prior art pumps, which simplifies the manufacture and assembly of this pump, and thereby makes it less expensive. Likewise the operation of this pump is reliable, guaranteeing a good quality spray, and making priming easier. Likewise, the fact that the return spring is never in contact with the fluid product avoids any risk of the product being corrupted through contact with a metal part (whether this spring is made of metal).

Although the invention has been described with reference to a particular embodiment thereof, it is understood that it is not restricted by the example shown. On the contrary, a man skilled in the art may make any effective modifications thereto without departing from the context of the present invention as defined in the appended claims.

The invention claimed is:

1. Pump for dispensing fluid products comprising a pump body (10), a pump chamber (20), at least one piston (30) sliding in said pump chamber (20) to dispense the fluid product, a dispensing orifice (45), and a shutter (38) interacting with said dispensing orifice (45), said shutter (38) being movable and/or deformable between a closed position of the dispensing orifice (45) and an open position of the dispensing orifice (45), said shutter (38) being elastically driven to its closed position, wherein the pump comprises only one elastic element (50) adapted for bringing said at least one piston (30) back to its rest position after actuation and for driving said shutter (38) to its closed position, and in that said at least one piston (30) is embodied in one piece with said shutter (38), wherein said pump is constituted by only four parts including a part forming a dispensing head (40), a part forming the piston (30) and the shutter (38), a part forming the elastic element (50), and a part forming the pump body (10), a retaining ring (15) and a plunger tube (18), wherein each of the four parts is a one-piece integral construction, the part forming the pump body (10), the retaining ring (15) and the plunger tube (18) also forming a seat (71) of an inlet valve (70) of the pump chamber (20) which interacts with a valve element (75), wherein the valve element (75) is integral with the part forming the piston (30) and the shutter (38), and the inlet valve (70) is open when the pump is in the rest position.

2. Pump according to claim 1, wherein said elastic element (50) is away from all contact with the fluid product.

3. Pump according to claim 1, wherein the retaining ring (15) is adapted to anchor said pump to a tank (60).

4. Pump according to claim 3, wherein said dispensing head (40) is connected, particularly by being snapped, irremovably onto said retaining ring (15), said dispensing head (40) and said retaining ring (15) forming a stop to define the rest position of the pump.

5. Pump according to claim 1, wherein the dispensing head (40) includes the dispensing orifice (45).

6. Pump according to claim 5, wherein said pump body (10) is placed inside said dispensing head (40).

7. Pump according to claim 1, wherein an insert (39) is placed in the pump chamber (20) upstream of the dispensing orifice (45).

8. Pump according to claim 7, wherein said insert (39) is embodied in one piece with said shutter (38).

9. Pump according to claim 1, wherein said pump chamber (20) is placed immediately upstream of said dispensing orifice (45), said shutter (38) forming an outlet valve of said pump chamber (20).

10. Device for dispensing fluid products including a tank (60), characterized in that the device comprises a pump according to claim 1.

11. Device according to claim 10, wherein the pump is anchored, particularly by being snapped on to the tank (60) with interposition of a gasket (65).

12. Pump according to claim 1, wherein the elastic element is a spring.

13. Pump according to claim 1, wherein the plunger tube (18) extends inside the pump body (1) through an axial tubular extension forming the valve seat (71) of the inlet valve (70), an insert (39) is placed in the pump chamber (20) upstream of the dispensing orifice (45), such that the insert (39) is embodied in one piece with said shutter (38) and forms the valve element (75) at a lower end thereof, and the valve element (75) is received by the valve seat (71) when the pump is in the closed position.

* * * * *